United States Patent [19]
Brunsch

[11] 3,713,753
[45] Jan. 30, 1973

[54] FIBER REINFORCED PLASTIC LAMINATE CONSTRUCTION OF AN AIRFOIL WING TYPE MEMBER

[75] Inventor: Klaus Brunsch, Weidach, Germany

[73] Assignee: Messerschmitt-Bolkow-Blohm Gesellschaft mit beschraenkter Haftung, Muenchen, Germany

[22] Filed: Aug. 5, 1969

[21] Appl. No.: 847,668

[30] Foreign Application Priority Data
Aug. 10, 1969 Germany..................P 17 79 433.1

[52] U.S. Cl. ....................416/226, 416/230, 416/241
[51] Int. Cl. ..............................................B64c 11/26
[58] Field of Search..............416/229, 241, 230, 226

[56] References Cited

UNITED STATES PATENTS

| | | | |
|---|---|---|---|
| 2,202,013 | 5/1940 | Lougheed | 416/230 UX |
| 2,380,336 | 7/1945 | Schwebel | 416/229 UX |
| 2,414,125 | 1/1947 | Rheinfrank | 416/230 UX |
| 3,237,697 | 3/1966 | Ford et al. | 416/230 UX |
| 2,175,204 | 10/1939 | Lougheed | 416/230 |
| 2,202,014 | 5/1940 | Lougheed | 416/230 |
| 2,995,777 | 8/1961 | Warnken | 18/36 |
| 3,021,246 | 2/1962 | Hutter et al. | 156/196 |

FOREIGN PATENTS OR APPLICATIONS

| | | | |
|---|---|---|---|
| 831,380 | 3/1960 | Great Britain | 416/230 |
| 412,300 | 6/1934 | Great Britain | 416/229 |

Primary Examiner—Everette A. Powell, Jr.
Attorney—McGlew and Toren

[57] ABSTRACT

A laminate construction for an airfoil wing type member, such as a helicopter rotor blade, is produced by machine winding multiple layers of reinforcing fiber about a foil-like material support layer on a rotatable mandrel. The laminate construction is cut from the mandrel and shaped to the desired configuration in a mold cavity with the addition of a hardenable resin filler material. In adjacent layers the fibers are wound to form a diamond shaped pattern. The pitch angles of the fibers in different layers can be varied to accommodate different conditions, and, in addition, the length of the wound layers along the mandrel can be varied as required.

4 Claims, 9 Drawing Figures

3,713,753

INVENTOR
Klaus Brunsch
By McGlew and Toren
ATTORNEYS

FIBER REINFORCED PLASTIC LAMINATE CONSTRUCTION OF AN AIRFOIL WING TYPE MEMBER

The invention is directed to the structure of an airfoil wing type member, such as a rotor blade for a helicopter, and, more particularly, it is directed to a laminate structure used in forming such a member and also to the method of and apparatus for forming such a structure. The laminate structure is formed of machine wound fibers set in a hardenable resin filler material. In addition, the invention concerns the construction of the airfoil wing type member and of component parts for securing the member to a support.

In the past, in the production of laminate structures for airfoil wing type members and the like, the cover layers have been laminated into mold cavities by hand using the contact method. Next, reinforcement cords, such as spar supports or the like, were built up and laminated by hand from single rovings using wet-in-wet bonding in the mold cavity. In this operation, the desired shape was attained by using a spatula and following a template. Only trained teams of specialists have been able to do this work satisfactorily, as experience has shown, and any unexpected absence of a member of such a team results in delays in the progress of the work. However, even with expert cooperation from all of the team members, deviations in weight or other conditions of the structure are inevitable in the production of a number of similarly dimensioned structures of this kind. As can be readily appreciated, the differences in work performed by hand are unavoidable, such as are caused by external influences or uncontrollable conditions. Moreover, the time required for the production of such fiber-reinforced plastic structures is generally quite long, in particular for the steps involving filling the mold. Accordingly, since it takes considerable time to build up the reinforcement cores or spars from individual rovings, the expensive pressing mold, in which the laminate structures are formed is taken out of use. These various characteristics of hand made laminate structures are obstacles to economical production and especially to quantity production. By means of the present invention, it is possible to avoid the variations in production which result from hand work and it is also possible to reduce, to a considerable extent, the time spent in forming the laminate structure and producing the airfoil wing type member. At the same time, while maintaining the quality of the products produced at a constant level, it is also possible to handle wet laminates formed outside the mold and which consist, at least in part, of large-area resin impregnated fabrics or webbing.

A primary object of the invention is the formation of a fabric or webbing composed of multiple layers of fibers, which form, in part, the shell and inserts for the laminate structure. The fibers are machine wound or coiled on a mandrel or core and are used in forming the different parts of the laminate structure. In this portion of the process, which is known in itself, the fibers or filaments are wound about a separator layer formed of a foil-like material wrapped about a rotatable mandrel. The fibers are guided as they are wound onto the mandrel and the pitch angle of the fibers can be varied depending on the direction of the stress to be experienced in the member formed from the laminate structure.

After completing the winding of the fibers on the mandrel, the laminate structure formed is removed and inserted into a press mold cavity in which the separator layer acts as a support and additional hardenable resin filler material is applied, in either a wet or prehardened state, and then the laminate structure is pressed in a known manner to complete the hardening or curing operation. In removing the laminate structure of the separator layer and the wound fibers from the mandrel it it cut along a line parallel with the axis of the mandrel and is lifted off in one or more sections. The sections removed from the mandrel are then used as the cover or shell of an airfoil wing type member to be formed. The size ratio between the laminate structure formed and the winding mandrel is of secondary importance. Depending on the parameters of the member to be formed in the mold, one or more sections can be cut from the structure wound on the mandrel, and, if necessary, subsequently they can be cut to shape.

At the present time an airfoil or driving wing formed of fiber-reinforced plastic shells has been known where the supporting shell is constructed from a plurality of cords embedded in plastic and arranged in side by side relationship extending in the longitudinal direction of the wing. Such a structure built in the conventional manner in a pressing mold is disclosed in German Auslegeschrift No. 1,045,810. The disadvantage of such a construction have been described above.

By means of the present invention, it is possible to produce a number of identical machine wound component parts for a series of structures. With the formation of the webbing or fabric by automatic means the fluctuating conditions previously experienced are avoided and the component parts can be formed with great precision.

With the present invention, it is possible to dispense with the need for expensive specialized labor and to effect a major reduction in the production times required for the formation of the laminate structure. In addition, it is possible to prefabricate various sections of the member to be produced in advance of the time for the final construction and the laminate structures can be stored in a semi-hardened state for a short period of time or in a pre-hardened state for a prolonged period. By virtue of the separator layer of the foil-like material proposed by the present invention, which acts as a support for the fibers wound on the mandrel, the separator layer permits easy removal of the wound component from the mandrel and it also makes it possible to handle and transport wet webbing formed of the wound fibers which are otherwise sensitive to mechanical stress. In addition, the separator layer serves to assist in sucking or pressing the fiber structure against the wall of the mold cavity as well as against other parts of the finished structure, for example, against a supporting core made of hard foam material.

Other important advantages of the invention stem from the machine winding of the fibers or filaments on the separator layer covering the mandrel which permits variations in the pitch angle of the fibers to accommodate the varying conditions in the member being formed. For example, in a rotor blade, in addition to being subject to centrifugal loads, it is also exposed to torsion stresses which are absorbed mainly in the shell or cover of the blade and also to bending loads which are absorbed in the spar or longitudinal support structure of the rotor blade. These various stresses are not the same in all of the cross-sectional planes of the rotor blade but vary in dependence on the blade suspension and also in accordance with the dimensions of the blade at a particular point. Since, in accordance with the present invention, it is possible to orient the fibers in the laminate structure in a selected arrangement, these various stresses can be accommodated by purposefully arranging the pitch angle of the fibers as they are wound. Another advantage gained in the present invention is applicable when the laminate structure is used in forming the spar for the rotor blade since the fiber reinforcement is seamless the main load extending substantially in the direction of the fibers cannot impinge on a seam area of low rupture limit.

Another feature of the present invention is the manner in which the separator layer formed of a foil-like material can be employed as a part of the shell of the finished airfoil type member or can be removed in the process of forming the member. After the fibers are wound on the separator layer and the thus formed laminate structure is cut and removed from the mandrel, it is placed within the cavity of a pressing mold and by vacuum means the structure is secured firmly within the cavity as the member hardens. In this manner, the separator layer forms an outer protective layer for the member and remains as a part of the cover layer or shell of the member. Alternatively, the separator layer may be removed from the laminated fiber webbing after the webbing has been securely placed in the mold cavity with the separator layer facing the mold separation plane.

In either of the above methods undesired air pockets are eliminated from between the mold cavity wall and the laminate structure and the foil-like material separator layer serves as a support for the fiber layers to assure that it is applied in a uniform manner against the mold cavity wall.

In forming the shell for the airfoil wing type member or its spar the winding of the fibers is performed in accordance with known filament winding methods with the same or different winding or pitch angles in the different layers. In certain cases it is advantageous to perform the winding with different types of filaments or fibers in different layers, for example, glass, metal or other fibers, for accommodating the various conditions to be experienced within the member. In addition, when using different types of fibers, different pitch angles may be used for each of the particular fiber types employed. Moreover, the different pitch angles employed may be used over the entire length of the mandrel or only over a selected part of its length in dependence on the conditions to be experienced within the member being formed.

Preferably, the parts of the airfoil wing type member to be formed which are closest to its axis of rotation are produced first. For example, by establishing a provisional turning point on the mandrel the winding can be performed first along a part of the mandrel length and then the wound fiber can be severed, for example, by means of a cutting wheel. By subsequently shifting the turning point laterally along the length of the mandrel one part of the coil length can be enlarged in relationship to the remainder of the wound structure to provide a step-wise wall thickness which can be varied in accordance with the stress peaks to be experienced in the member being formed.

In winding the laminate structure, especially for the formation of the spar for the member, by introducing a suitable fluid medium, either liquid or gaseous, such as compressed air, through the circumferential periphery of the mandrel into the space between its outer surface and the separator layer formed of the foil-like material, the laminate structure can be expanded and its removal from the mandrel facilitated. This arrangement is of particular advantage for long coil bodies having a relatively small diameter. The slight expansion of the laminate structure due to the introduction of the pressurized fluid medium can be taken into account in establishing the winding angle, that is, the winding angle can be made smaller than the pitch angle for the fully hardened and expanded structure.

Another feature of the invention involves filling the hollow spar or longitudinal support for the finished member with a heated pressurized fluid medium to expand the spar and to press the laminate structure against the enclosing parts of the air foil wing type member. To effect this interior pressurization of the spar a device is employed which comprises a hollow mandrel with nozzle type openings through its periphery through which a fluid medium can be forced between the mandrel surface and the separator layer of foil-like material. With this arrangement, considerable difficulties which have been experienced in the past can be avoided and the wound fibers and plastic materials can be embedded into the shell forming the outer layer of the member. The outward pressurization of the spar structure is matched by the closing pressure of the mold.

In addition, the present invention involves the formation of a junction member of a similar hardened laminate structure to provide the attachment of the airfoil wing type member to a support. The junction member is wound as a hemisphere at one end with a transition section securing it to a support. The hemisphere is formed with an aperture in its domed shaped construction and the aperture is defined by a toroidally thickened edge or rim for receiving an anchoring member which can be formed of metal. By this arrangement the time consuming chore of placing loop type attachment members, consisting of rovings, as used in the past, can be eliminated. In addition, in attaching the member to its support a support ring is used in securing an anchor member to the junction member.

Another element of the invention is the machine employed for winding the fibers, such as plastic coated fibers on a revolving mandrel. The machine is formed by a winding head which is moved back and forth along a mandrel in a line parallel with its axis of rotation. The machine is provided with a device for varying the speed of travel of the winding head and also of the rotation of the mandrel so that the pitch angle of the fibers or filaments wound can be varied, preferably within limits between 0° and 45°. By means of this device, it is possible, such as in the formation of the spar, to dispose the reinforcement fibers at different pitch angles along the total length of the spar in accordance with the stresses to be experienced during the operation of the airfoil wing type member.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
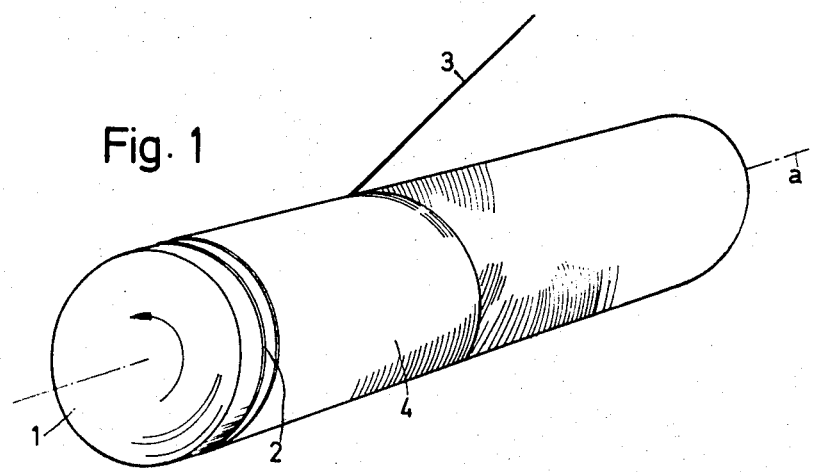
FIG. 1 shows, in a perspective view, the manner of winding a laminate structure for use in forming an airfoil wing type member.

In FIG. 1 a rotating mandrel 1 is shown having a separator layer of a foil-like material covering the circumferential periphery of the mandrel. On the outer surface of the foil-like material 2, fibers or filament like members 3 are machine wound back and forth along the mandrel so that adjacent layers of the multi-layer webbing formed on the separator layer are disposed in a diamond shaped winding pattern. Accordingly, a laminate structure 4 of a multiple number of layers of machine wound fibers is provided on the base or separator layer 2. When the laminate structure 4 is completely wound, one or a number of severing cuts extending in the axial direction a of the mandrel are made for removing the structure in one or a number of mats or sheets which are placed in the mold cavity 5 (see FIGS. 2 and 3).

Figure 2:
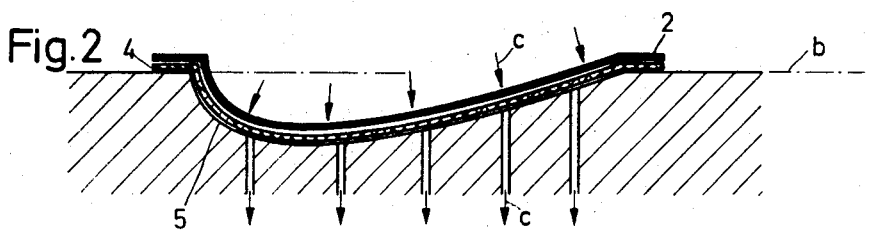
FIG. 2 is a side view of a mold cavity with a laminate structure placed in the cavity.
Figure 3:
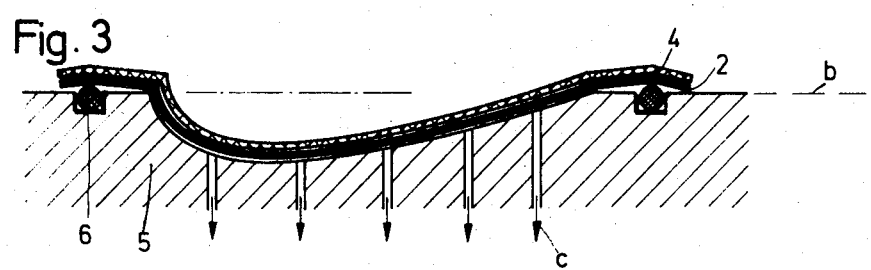
FIG. 3 is a mold cavity similar to that in FIG. 2, but with the laminate structure in a reversed position.

Each of FIGS. 2 and 3 shows one-half of a mold, the mirror-symmetrical other halves of the molds are not shown. The top edge b of the mold half as shown affords the division plane between the two mold halves. In removing the laminate structure from the mandrel the separator layer 2 serves as a support. In FIG. 2, the foil-like material 2 is faced outwardly and the laminate structure 4 formed of the wound fibers is positioned against the surface of the cavity 5. The laminate structure is applied in a positive manner against the surface of the cavity either by a pressure device not shown, which may be operated hydraulically or pneumatically, or by vacuum means which operate in the manner indicated by the arrows c and the passageways extending through the mold to the surface of its cavity. When a suction effect is employed, it acts through the porous and gas permeable laminate structure and pulls the separator layer 2 firmly against the mold cavity surface. Due to the vacuum effect any air inclusions within the laminate structure are eliminated.

As indicated in FIG. 3, when a vacuum effect is being employed, a packing 6 must be inserted in the edge zone of the mold cavity 5 so that a seal is provided between the laminate structure 4 and its separator layer 2 and the surface of the mold cavity. In FIG. 3, the positions of the separator layer 2 and the fiber laminate structure 4 are reversed so that the separator layer is disposed against the surface of the mold cavity. This arrangement of the separator layer-laminate structure should be employed when the foil-like material of the separator layer is to serve as the outer protective surface or shell of an airfoil wing type member, such as a rotor blade, after the molded member has been sufficiently hardened.

Figure 4:
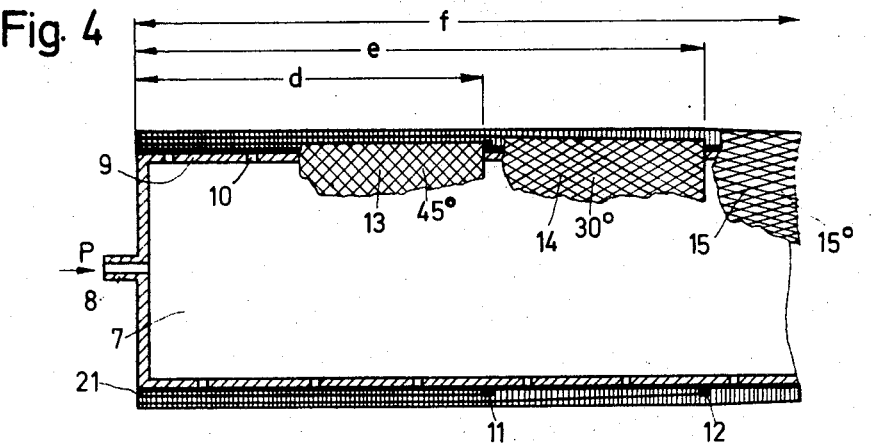
FIG. 4 is a longitudinal sectional view of a core or mandrel for use in forming a spar member.

FIG. 4 shows the arrangement of a winding mandrel for making a spar for a rotor blade. The mandrel is formed of a hollow closed metallic casing 7 having a connecting pipe 8 through which a fluid medium having an internal pressure $P$ can be supplied into the mandrel. In the generated or lateral peripheral surface 9 of the mandrel a number of spaced bores 10 are provided through which the pressurized fluid medium is introduced between the surface 9 and the separator layer 21. A plurality of stepped wound fiber course 13, 14 and 15 are provided on the separator layer 21. On the exterior surface of the mandrel provisional turning flanges 11 and 12 are provided so that the course 15 of wound fibers extends for the entire wound length $f$ of the spar while the other fiber courses 13 and 14 extend for the lengths $d$, $e$, respectively, which represent only a portion of the entire length of the spar. As can be noted the fiber course 15 forms the exterior surface of the laminate structure extending over both of the other courses 13 and 14 while the course 14 extends over the inner course 13. The stepped offsets resulting from the shorter course lengths $d$ and $e$ are rounded due to the overlying courses which are longer in the axial direction of the mandrel. As indicated in FIG. 4, each of the courses has a different pitch angle, for example, course 13 having the length $d$ has a pitch angle of 45° while the course 14 having a length $e$ has a pitch angle of 30° and course 15 with the full length $f$ of the spar has a pitch angle of 15°. Accordingly, the thickness of the wound laminate structure can be adapted to the particular load characteristics affecting the spar during operation and this accommodation is achieved in a simple manner.

Depending on the stresses or loads which act on the spar it is possible to employ fibers of different materials, such as glass, metal or other types, for the different courses 13, 14 and 15 of the laminate structure. The use of fibers of different types can be easily accommodated in the winding method employed in the present invention.

Figure 5:
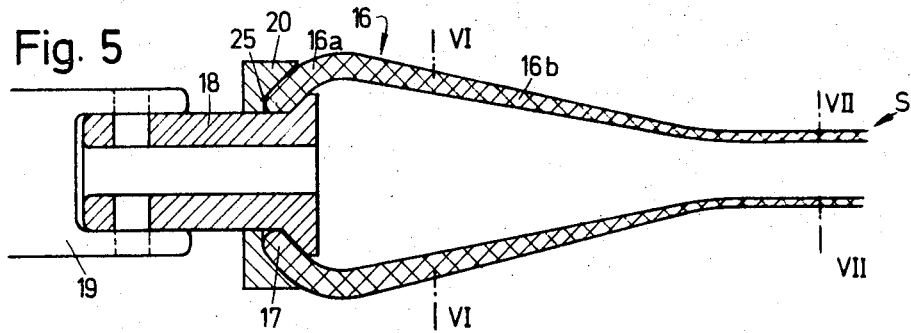
FIG. 5 is a sectional view of an airfoil wing type member illustrating the blade root and its junction member.

In FIG. 5, a junction member 16 is shown for securing the rotor blade to its support. The junction member 16 is formed in the same manner as the body of the rotor blade. In forming the junction member a mandrel, not shown, is used with the fibers being placed on the end of the mandrel by the known polar winding method. As constructed, the junction member has a hemispherical end section 16a of enlarged cross section which narrows down in a transition section 16b to the cross sectional dimensions of the spar S. The end section 16a has an opening 25 defined by a toroidal edge 17 of the fiber wound member. A metallic anchoring member 18 is secured within the hemispherical shaped end of the junction member 16 and the anchoring member is connected to the rotor head, not shown, by a support 19. Positioned on the toroidal edge 17 of the junction member 16 is a retention ring 20 which is fixed to the anchoring member 18 and contacts the end section 16a about its toroidal edge 17.

Figure 6:
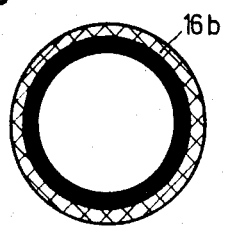
FIG. 6 is a transverse sectional view taken along line VI—VI in FIG. 5.
Figure 7:
FIG. 7 is a transverse sectional view taken along line VII—VII in FIG. 5.

In FIGS. 6 and 7, transverse sections of the junction member 16 and the spar S are indicated. By comparing the sections shown in FIGS. 6 and 7 it will be apparent that the transition section 16b of the junction member 16 changes from the oval shape shown in FIG. 7 to the circular shape indicated in FIG. 6. In the cross section of the spar the separator layer of foil-like material 21 is used as a pressure tubing for applying the fiber laminate structure 13–15 against the laminate structure forming the outer shell of the rotor blade. The separator layer 21 remains in the interior of the blade after the synthetic resins incorporated with the fibers have hardened.

Figure 8:
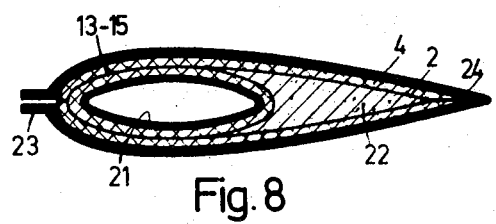
FIG. 8 is a transverse sectional view through an airfoil wing type member incorporating the spar illustrated in FIG. 7.

In FIG. 8, a transverse section of the completed rotor blade is shown with the combined separator layer 2 and laminate construction 4 forming the hardened shell of the blade which encloses the spar S formed by the wound courses 13, 14 and 15 on the separator layer 21. Additionally, a supporting body 22 formed of a hard foam material is placed within the rotor blade shell and contacts a portion of the exterior of the spar. Further, other parts not shown, can be incorporated into the blade such as weights for correcting the position of axis of gravity of the blade. Along the leading edge of the airfoil wing type member, the edges 23 of the separator layer projecting beyond the mold edge are trimmed off after the rotor blade has hardened.

Figure 9:
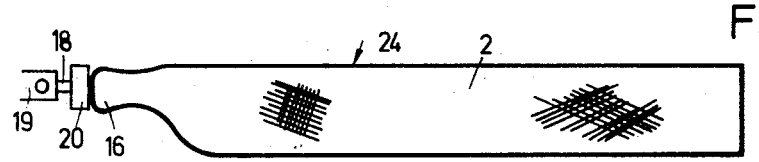
FIG. 9 is a somewhat schematic plan view on a reduced scale, of a finished airfoil member.

In FIG. 9, a finished rotor blade 24 is shown having a junction member 16, as illustrated in detail in FIG. 5, secured by means of a retention ring 20 to an anchoring member 18 which, in turn, is secured within a support 19. From the schematic representation of the formation of the fiber wound laminate structure of the rotor blade it can be seen that the fibers underlying the separator layer 2 have different pitch angles at spaced locations from the junction member 16.

As layer 2 a thin sheet of 0.01 in. of polyethylene or polyvinylchloride can be used. The junction member 16 according to FIG. 5 is suitably made by coiling machines as known, for example, from the publication "FILAMENT WINDING, by Rosato Grove, 1964 Interscience Publishes, Wiely & Sons, New York." It is also possible to coil such junction members 16 by hand.

I claim:

1. A laminate structure for forming the shell of an airfoil wing type member comprising a support layer formed of a foil-like material, a resin impregnated webbing formed on said support layer, said webbing comprising a plurality of superposed layers of machine wound fibers, said fibers in each said layer having the same winding angle and disposed in laterally spaced relationship to one another, in adjacent said layers in which said fibers have the same winding angle the winding angle is reversed for forming a diamond shaped winding pattern by means of the adjacent layers, and said webbing having at least two groups of said layers with the layers in each said group having a winding angle which is different from the winding angle of the other said group.

2. An airfoil wing type member comprising a longitudinally extending tubular shaped spar support having an oval shaped transverse section and comprising an inner layer formed of a foil-like material and an outer layer of resin impregnated fibers machine wound in a laterally spaced manner into a multiplicity of superposed layers with the fibers disposed at a pitch angle arranged obliquely to longitudinal axis of said support, said layers arranged in a number of superposed groups with said layers in each group having the same winding angle which is different from the winding angle of the other groups, adjacent said layers in each of said groups having the direction of the winding angle reversed for providing a diamond shaped winding pattern by means of the adjacent layers, a junction member integrally secured to one end of said spar support and comprising a transition section extending axially from said spar support and terminating in a hemispherically shaped section located at the end of said transition section remote from said support, said transition section having an oval shaped cross section at its connection to said support and the cross section being changed to a circular one at its end integrally secured to said hemispherically shaped section, said junction member comprising a hardened laminate structure comprising an inner foil-like layer and a multiplicity of machine wound fibers about said foil-like layer for the length of said transition and hemispherically shaped sections, said hemispherically shaped section having an aperture centrally arranged therein and said fibers being wound in said hemispherically shaped section to provide a toroidally shaped thickened edge defining the periphery of the aperture therethrough.

3. An airfoil wing type member, as set forth in claim 2, comprising an anchor member inserted into said hemispherically shaped section of said junction member through the aperture therein, a support ring disposed about said anchor member exteriorly of said junction member and securing said anchor member to said junction member.

4. An airfoil wing type member, as set forth in claim 2, wherein a shell is formed on said support spar with said shell having an airfoil shaped and comprising an upper section and a lower section joined together along a longitudinally extending seam at the leading edge and trailing edge of the airfoil shape, each of said upper and lower sections comprising an outer layer of a foil-like material and a multiplicity of layers of resin impregnated machine wound fibers disposed on the inner surface of said foil-like layer, and a filler material being positioned between said upper and lower sections exteriorly of said spar support for completely filling the space between said upper and lower sections.

* * * * *